United States Patent [19]
Enomoto et al.

[11] Patent Number: 5,291,941
[45] Date of Patent: Mar. 8, 1994

[54] AIRCONDITIONER HAVING SELECTIVELY OPERATED CONDENSER BYPASS CONTROL

[75] Inventors: Masayoshi Enomoto, Obu; Hiroshi Kishita; Satoshi Itoh, both of Kariya, all of Japan

[73] Assignee: Nippondenso Co., Ltd., Kariya, Japan

[21] Appl. No.: 902,238

[22] Filed: Jun. 23, 1992

[30] Foreign Application Priority Data

| Jun. 24, 1991 | [JP] | Japan | 3-151605 |
| Oct. 23, 1991 | [JP] | Japan | 3-275449 |
| May 8, 1992 | [JP] | Japan | 4-116325 |

[51] Int. Cl.$^5$ ............................................. F25B 29/00
[52] U.S. Cl. ................................. 165/62; 165/43;
237/2 B; 237/12.3 B; 237/12.3 R; 62/196.4
[58] Field of Search .......... 237/2 B, 12.3 B, 12.3 R;
62/196.4; 165/62, 42, 43

[56] References Cited
U.S. PATENT DOCUMENTS 4,893,748 1/1990 Balducci ........................ 62/196.4

FOREIGN PATENT DOCUMENTS

| 3428704 | 2/1986 | Fed. Rep. of Germany | 62/196.4 |
| 57-47829 | 10/1982 | Japan . | |
| 0035619 | 2/1985 | Japan | 237/2 B |

*Primary Examiner*—John K. Ford
*Attorney, Agent, or Firm*—Cushman, Darby & Cushman

[57] ABSTRACT

A heater core is connected with an engine to receive a hot engine-coolant, which operates as a main heater. An evaporator in a refrigerating cycle operates as an auxiliary heater. A condenser is connected to an outlet of the compressor, and the evaporator is connected to an inlet of the compressor. A bypass conduit is provided, one end of which is connected to the outlet side of the compressor and another end of which is connected to an inlet side of the evaporator. A expansion valve is disposed in the bypass conduit. In heating stage, the compressed hot refrigerant discharged from the compressor flows into the bypass conduit. The refrigerant is expanded by the expansion valve and radiates the heat in the evaporator.

7 Claims, 10 Drawing Sheets

AIRCONDITIONER HAVING SELECTIVELY OPERATED CONDENSER BYPASS CONTROL

BACKGROUND OF THE INVENTION

The present invention relates to an air conditioner, especially and air conditioner used for an automobile.

Japanese Patent 57-47829 shows a conventional air conditioner, wherein an evaporator is defrosted by a gas-phase refrigerant which is at a high temperature and under high pressure. When the evaporator is frosted, the gas-phase refrigerant discharged from a compressor is introduced into the evaporator so as to defrost the evaporator. The refrigerant that has flowed through the evaporator is returned to the compressor through an accumulator as in the gas-phase process.

A conventional air conditioner is equipped with a heater core through which a warmed engine coolant flows. As shown in FIG. 9, an internal-combustion engine 1 is connected to heater core 3a of heater unit 3 through an inlet conduit 2 and an outlet conduit 4 on which a valve 5 is provided. The heater core 301 is disposed downstream of an evaporator 14, whereby air introduced by a fan 28 flows through the evaporator 14 and then through the heater core 3a. An electric heater, a combustion heater or a heat pump is used as an auxiliary heat source while the heater core 301 is used as a main heat source.

The conventional air conditioner shown in Japanese Patent 57-47829 is designed to defrost the evaporator by use of hot refrigerant, not to increase the heating efficiency. The temperature of the engine coolant is not elevated rapidly right after the engine is started, so that a long time is required to radiate enough heat from the heater core.

The conventional air conditioner having the auxiliary heat source has further problems as follows. The electric heater consumes a lot of electric energy; the combustion heater has a safety hazard; and the heat pump is not operative in cold climates.

SUMMARY OF THE INVENTION

An object of the present invention is to increase the heating ability of an air conditioner by using a high-temperature and high-pressure gas-phase refrigerant.

An evaporator is disposed in series with a heater core. An outlet of a compressor is connected with an outlet of a condenser through a bypass conduit on which an expansion valve is disposed. The compressor and the condenser are connected with each other through a main conduit. At a diverging point of the bypass conduit from the main conduit, a switching valve is disposed for selecting alternatively a flow through the main conduit or a flow through the bypass conduit.

As shown in FIG. 2, when the switching valve opens the bypass conduit and closes the main conduit, the hot gas phase refrigerant discharged from the compressor 10 flows into the bypass conduit and the pressure thereof is reduced by a second expansion valve 22. The expanded refrigerant flows into a heat exchanger 14 which operates as an evaporator in a refrigerating cycle, and radiates heat therefrom. Since the heat is radiated from both the heater core and the heat exchanger 14, the total amount of radiation is increased and the warming ability of the air conditioner is improved.

DETAILED DESCRIPTION OF THE PREFERRED EMBODIMENT

Figure 1:
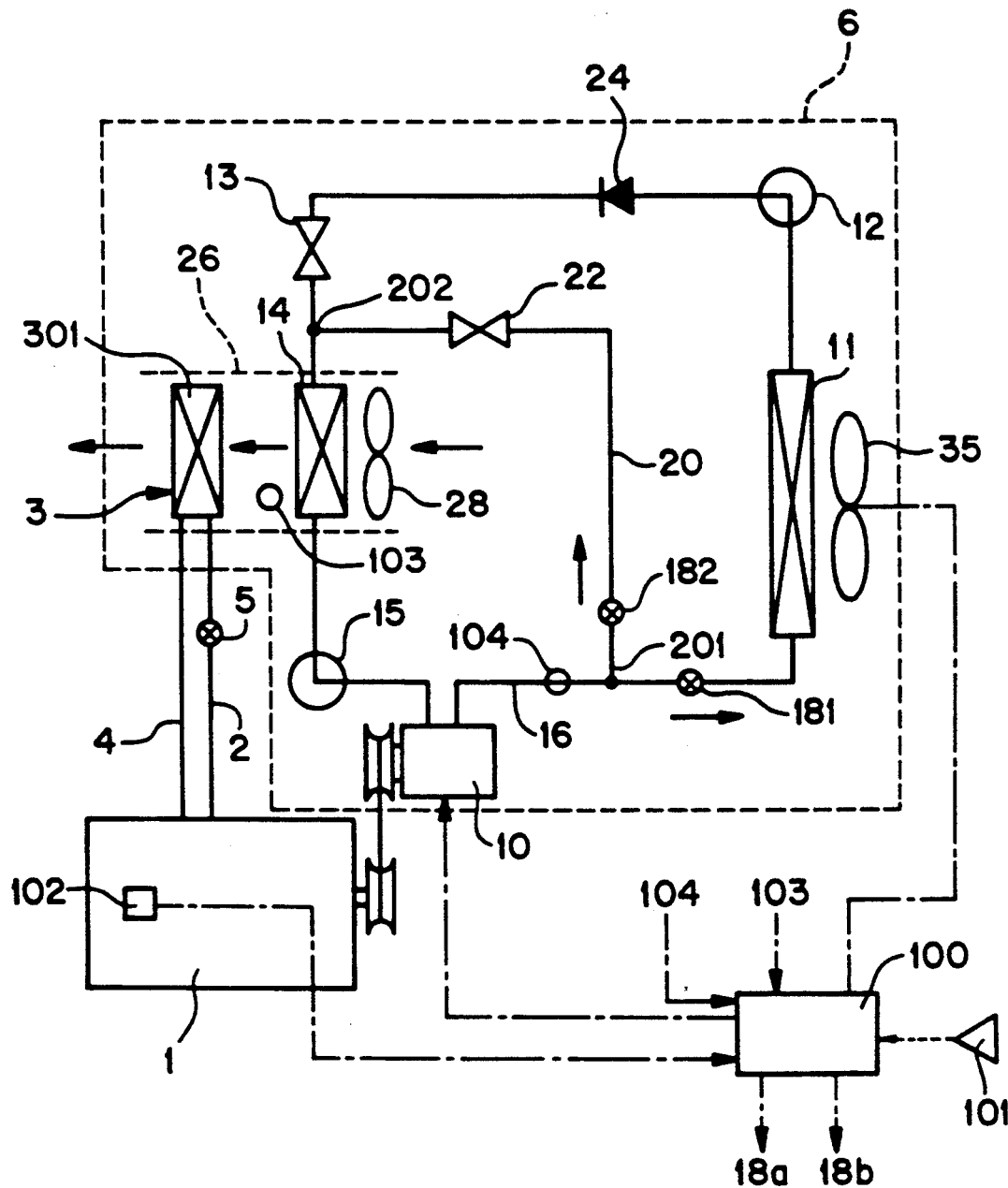
FIG. 1 is a refrigerating circuit showing a first embodiment of the present invention.

FIG. 1 shows a refrigerating circuit of a first embodiment of the present invention which is adopted for use in an automobile.

A water jacket of an internal combustion engine 1 is connected to a heater core 301 of a heater unit 3 through an inlet conduit 2 and an outlet conduit 4. A water-temperature sensor 102 is disposed in the water jacket to detect the temperature of the engine coolant. A valve 5 is disposed on the inlet conduit 2 so as to close the inlet conduit 2 when the temperature of the engine coolant is below a predetermined value.

The refrigerating cycle of the air conditioner 6 is comprised 10 of a compressor driven by the engine 1, a condenser 11, a receiver 12, a first expansion valve 13, a heat exchanger 14 as an evaporator and an accumulator 15, which are connected to each other in series through a main conduit 16. A first electric valve 181 is disposed on the main conduit 16 between the compressor 10 and the condenser 11. A first end 201 of a bypass conduit 20 is connected to the main conduit 16 between the first electric valve 181 and the compressor 10. A second end 202 of the bypass conduit 20 is connected to the main conduit 16 between a first expansion valve 13 and the heat exchanger 14. The bypass conduit 20 is provided with a second expansion valve 22 and a second electric valve 182 which is disposed between the first end 201 of the bypass conduit 20 end the second expansion valve 22. A fan 35 is disposed in front of the condenser 11 and introduces air toward the condenser 11 for cooling the condenser 11.

The pressure of refrigerant flowing in the bypass conduit 20 is 15 $Kg/cm^2$ or more before expansion by the second expansion valve 22 and is 2–4 $Kg/cm^2$ after expansion. When the temperature of air outside is low, the temperature of refrigerant flowing through the heat exchanger 14 is also low. In order to obtain enough radiation from the heat exchanger 14, the pressure of refrigerant before expansion is kept high. In other words, the work of compression of the compressor 10 should be increased so as to get enough heat from the heat exchanger 14.

A check valve 24 is disposed on the main conduit 16 between the receiver 12 and the first expansion valve 13 for preventing a back flow toward the condenser 11. The accumulator 15 accumulates the liquid-phase refrigerant for preventing the flow of liquid back to the compressor 10 when the refrigerant is in surplus.

A thermistor 103 is disposed downstream of the heat exchanger 14 for detecting the temperature of the air passing through the heat exchanger 14. A pressure sensor 104 is disposed in the main conduit 16 between the compressor 10 and the first end 201 of the bypass conduit 20 for detecting the pressure of the refrigerant in the main conduit 16. A switching device 101 is used for inputting a ON-OFF signal of heating or cooling to control unit 100. Control unit 100 receives signals from the water-temperature sensor 102, the thermistor 103, the pressure sensor 104 and the switching device 101 and controls the operations of the compressor 10, the first electric valve 181, the second electric valve 182 and the fans 28, 35.

The thermister 103 detects the temperature of the air downstream of the heat exchanger 14. The control unit 100 determines whether the heat exchanger 14 is frosted according to the signal of the thermistor 103. When the control unit 100 determines that the heat exchanger 14 is frosted, the control unit 100 transmits a signal to stop the compressor 10. After the compressor 10 is stopped, the heat exchanger 14 is defrosted by air passing through the heat exchanger 14. When the control unit 100 determines that the heat exchanger 14 is defrosted, the compressor 10 is driven again. When the heat exchanger 14 radiates the heat in the heating stage, the compressor 10 is always driven.

The pressure sensor 104 detects the pressure of the refrigerant discharged from the compressor 10. When the pressure detected by the pressure sensor 104 is out of the proper range, the control unit 100 transmits a signal to stop the compressor 10. When the pressure detected by the pressure sensor 104 is in the proper range, the compressor 10 is driven. In the heating stage, the compressor is always driven regardless of the pressure.

The water temperature sensor 102 detects the temperature of the engine coolant. When the temperature of the engine coolant is above a predetermined value, the engine coolant flows into the radiator (not shown) so as to radiate the heat therefrom. In the heating stage, when the control unit 100 determines that the radiator is radiating heat, the compressor 10 is stopped according to the signal from the control unit 100. When the water temperature sensor 102 detects that the temperature of engine coolant is under the predetermined value, the compressor is driven again.

The heater core 301 as the main heat source and the heat exchanger 14 as the auxiliary heat source are disposed in series in a duct 26. The air introduced into the duct 26 by the fan 28 flows though the heat exchanger 14 and the heater core 301 toward a cabin of an automobile (not shown).

In the cooling stage, the first electric valve 181 is opened and the second electric valve 182 is closed. The refrigerant discharged from the compressor 10 flows through the condenser 11, the receiver 12, the first expansion valve 13, the heat exchanger 14 and the accumulator 15 and returns to the compressor 10. The heat exchanger 14 operates as an evaporator and deprives the air of heat. The cooled air passes through the heater core 301 and is introduced into the cabin.

In the heating stage, the first electric valve 181 is closed and the second electric valve 182 is opened. The refrigerant discharged from the compressor 10 flows into the bypass conduit 20 and its pressure is reduced by the second expansion valve 22 to be a high-temperature and low pressure refrigerant in the gas phase.

The expanded refrigerant flows into the heat exchanger 14 and exchanges heat with the air introduced into the duct 26, whereby the air is warmed. The warmed air flows through the heater core 301, receives heat from the heater core 301, and is introduced into the cabin.

Figure 2:
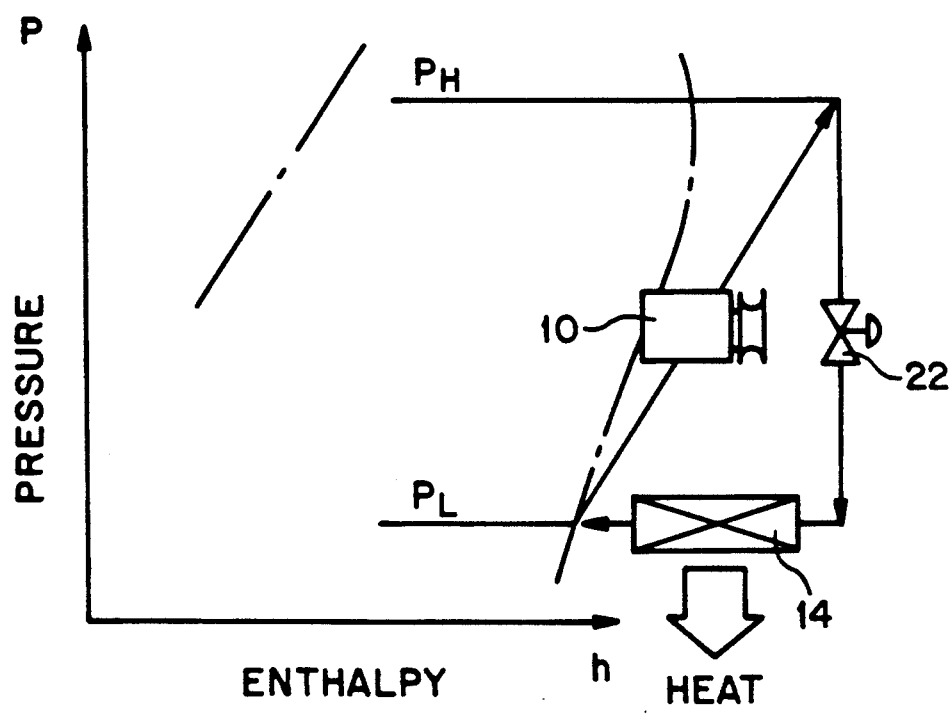
FIG. 2 is a Mollier chart for explaining the first embodiment of the present invention.

FIG. 2 is a Mollier chart which shows the operation of the present invention in the heating stage. The compressor 10 compresses the refrigerant so that the pressure of the refrigerant is elevated from $P_L$ to $P_H$ and the enthalpy of the refrigerant is increased. The pressurized refrigerant is expanded by the second expansion valve 22, so that the pressure of the refrigerant is dropped from $P_h$ to $P_L$ without any changes in the enthalpy thereof. The low-pressure and high-temperature refrigerant radiates the heat in the heat exchanger so that the enthalpy of the refrigerant is decreased.

Figure 3:
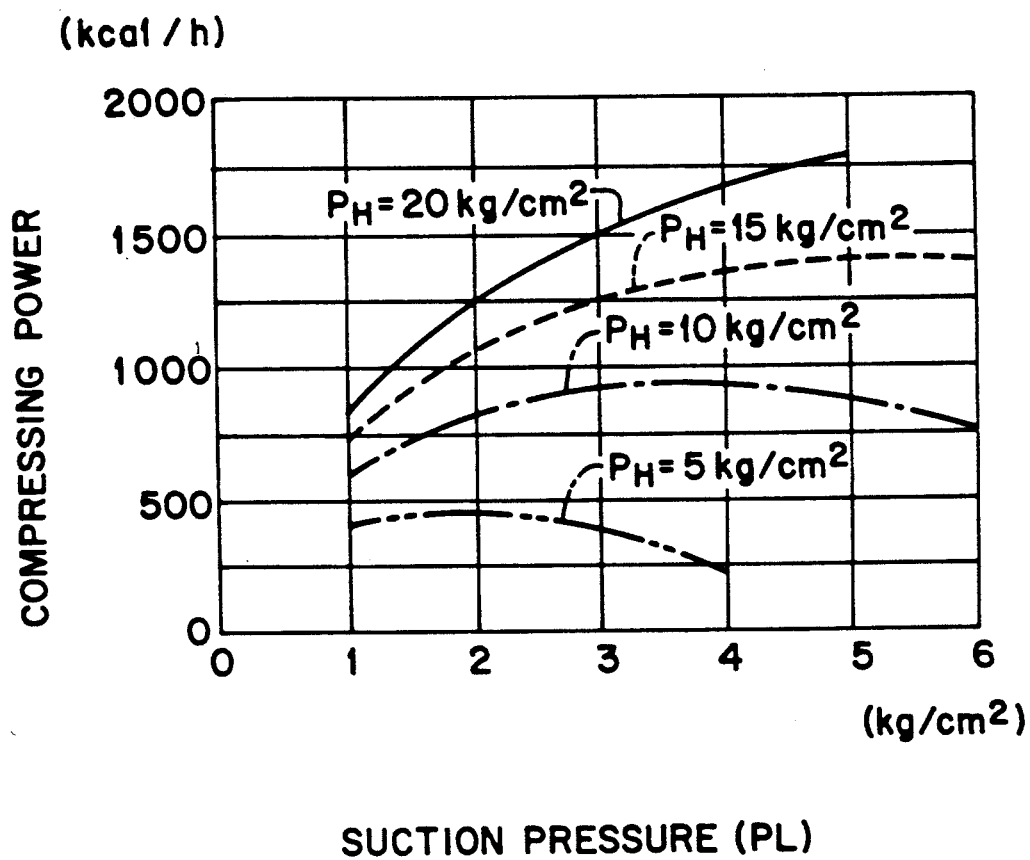
FIG. 3 is a chart showing a relationship between the suction pressure and the compressing power of the compressor.

The compressing work of the compressor 10 represented by the increment of the enthalpy and the pressure is converted into heat which is radiated by the heat exchanger 14. As shown in FIG. 3, it is preferable that the pressure $P_H$ is over 15 Kg/cm$^2$ while the pressure $P_L$ is 1 Kg/cm$^2$–5 Kg/cm$^2$ so as to acquire enough enthalpy.

Since the compressor 10 is driven by the engine 1, the load of the engine 1 is increased to drive the compressor 10. The heat generated in the engine 1 is transferred to the engine coolant and is radiated in the heater core 301. The air flowing in the duct 26 is warmed by the heat exchanger 14 and the heater core 301.

When the air conditioner is not in operation, the first electric valve 181 is closed and the second electric valve 182 is opened, so that the refrigerant does not flow into the condenser 11 and the receiver 12 and does not stay therein. Therefore, the refrigerant is kept in enough amount for circulating through the bypass conduit 20 in the heating stage.

Figure 10:
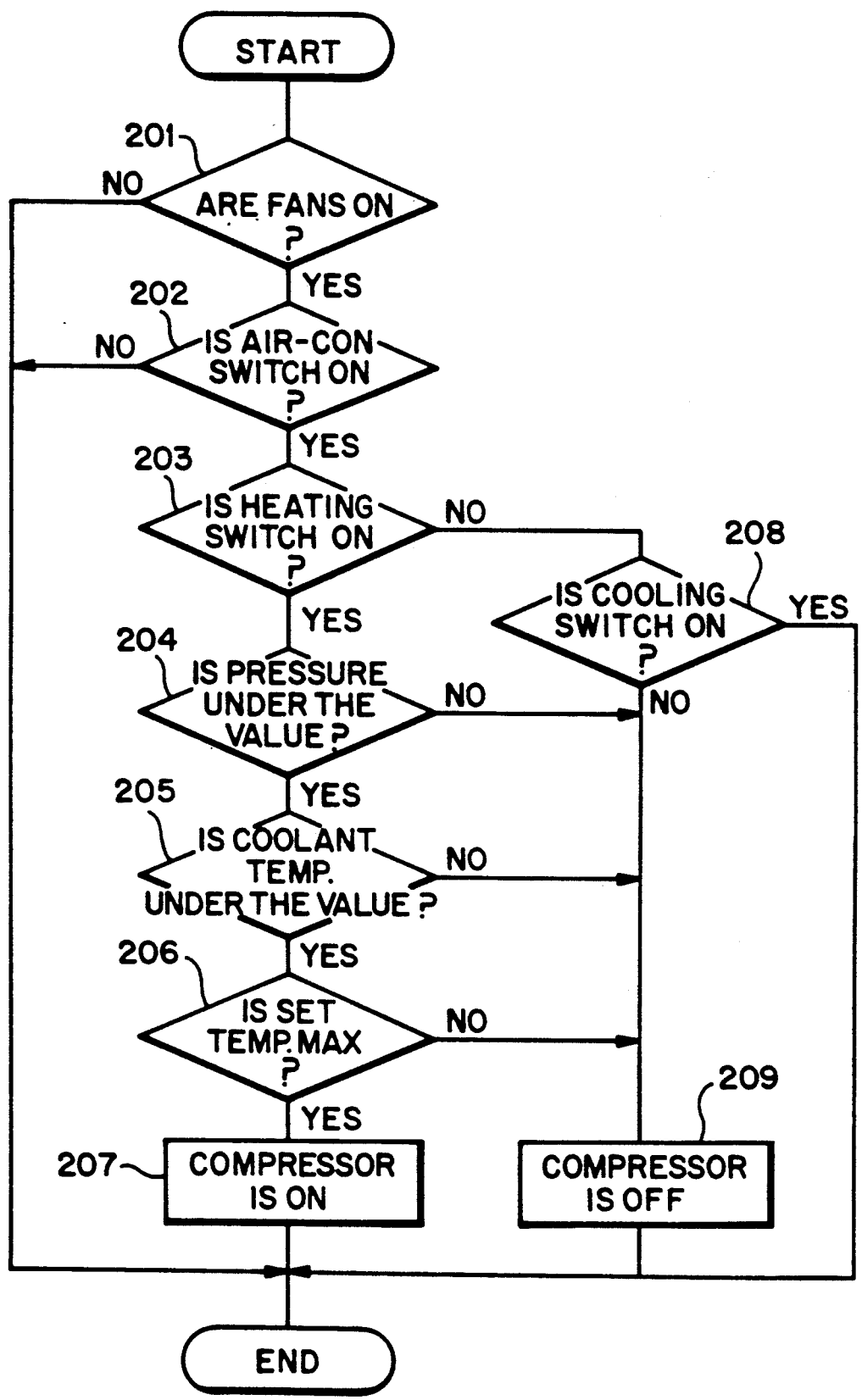
FIG. 10 is a flow chart for explaining the operation of the first embodiment of the present invention.

The operation of the present embodiment in the heating stage is carried out according to the flow chart shown in FIG. 10. In step 201, it is determined whether the fans 28, 35 are on. When the fans 28, 35 are on, it is determined whether an air conditioner switch is on in step 202. When the air conditioner switch is on, it is determined whether a heating switch is on in step 203. When the heating switch is on, it is determined whether the pressure of refrigerant is under the predetermined value. When the pressure of the refrigerant is over the predetermined value, the compressor 10 is stopped to prevent over-load of the compressor 10. When the pressure of the refrigerant is under the value, it is determined whether the temperature of the engine coolant is under the predetermined value in step 205. When the temperature of engine coolant is over the value, the compressor 10 is stopped in step 209 since the heater core 301 radiates enough heat for heating the cabin. When the temperature of the engine coolant is under the predetermined value, it is determined whether a set temperature is a maximum temperature in step 206. When the set temperature is at a maximum, the compressor 10 is driven and the heat exchanger 14 is operated as the auxiliary heat source in order to increase the heating ability of the air conditioner. When the set temperature is not at a maximum, the compressor 10 is not driven to save the driving energy.

In the cooling stage, when the pressure of the refrigerant discharged from the compressor becomes over the predetermined value, the compressor is stopped. When the pressure of the refrigerant in the heat exchanger 14 is under the predetermined value, the compressor 10 stopped to prevent frosting of the heat exchanger 14. In the heating stage, however, even when the pressure of the refrigerant in the heat exchanger 14 is under the predetermined value, the compressor 10 is driven to introduce the hot refrigerant into the heat exchanger 14.

In the present embodiment, the heat exchanger 14 may be disposed downstream of the heater core 301. The check value 24 may be replaced by an electric valve. A thermostat may be used instead of the thermistor 103.

Figure 4:
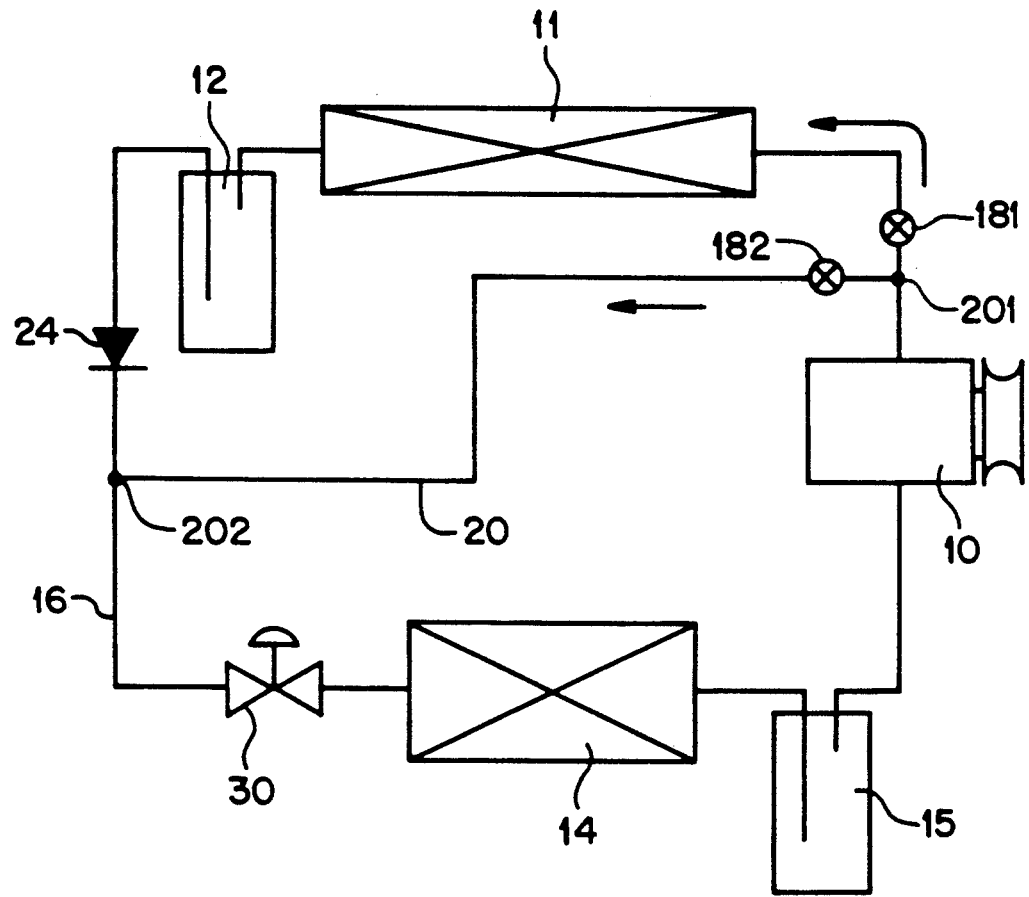
FIG. 4 is a refrigerating circuit showing a second embodiment of the present invention.

Another embodiment of the present invention is shown in FIG. 4. An expansion valve 30 is disposed in the main conduit 16 between the second end 202 of the bypass conduit 20 and the heat exchanger 14. The expansion valve 30 corresponds to the first expansion value 13 and the second expansion value 22 of the previous embodiment. The remaining structure is similar to that of the previous embodiment.

Figure 5:
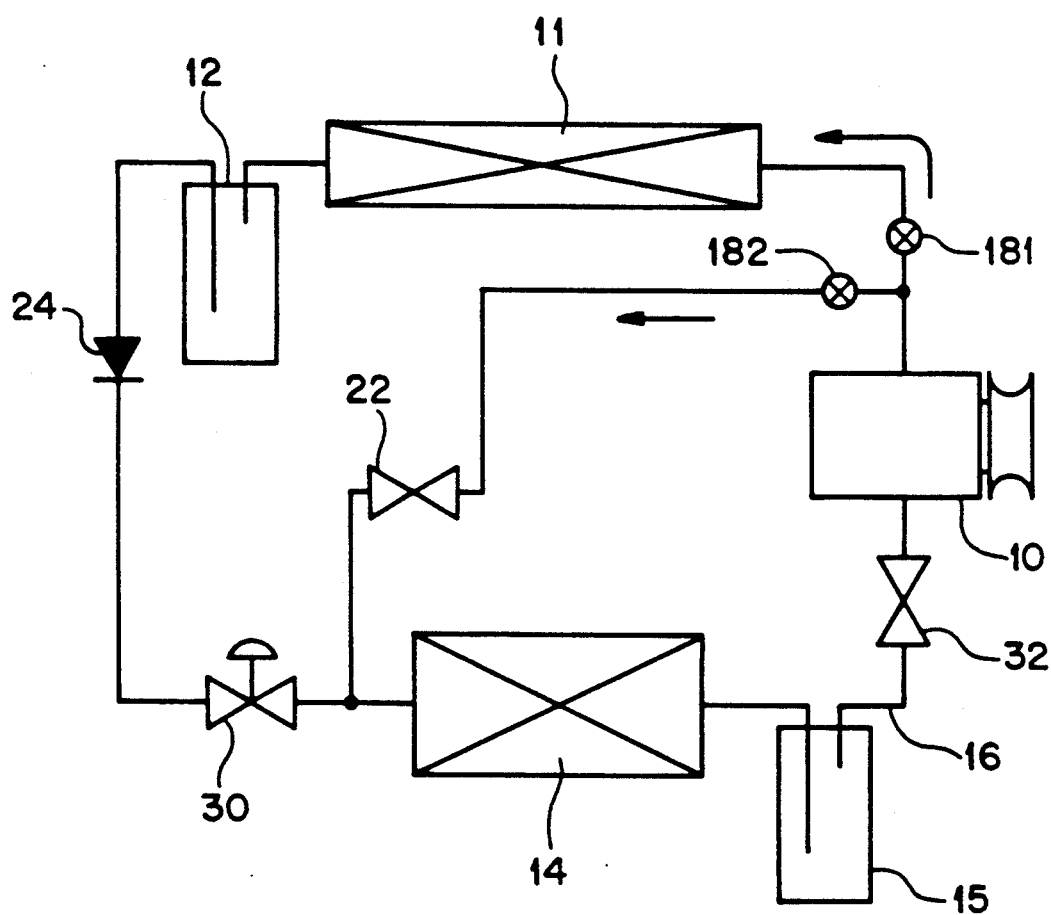
FIG. 5 is a refrigerating circuit showing a third embodiment of the present invention.

FIG. 5 shows a third embodiment of the present invention. An expansion valve 32 is provided between the accumulator 15 and the compressor 10. Even if the load of the compressor 10 is varied, the pressure of the refrigerant in the heat exchanger 14 is maintained in a proper range by the expansion valve 32.

Figure 6:
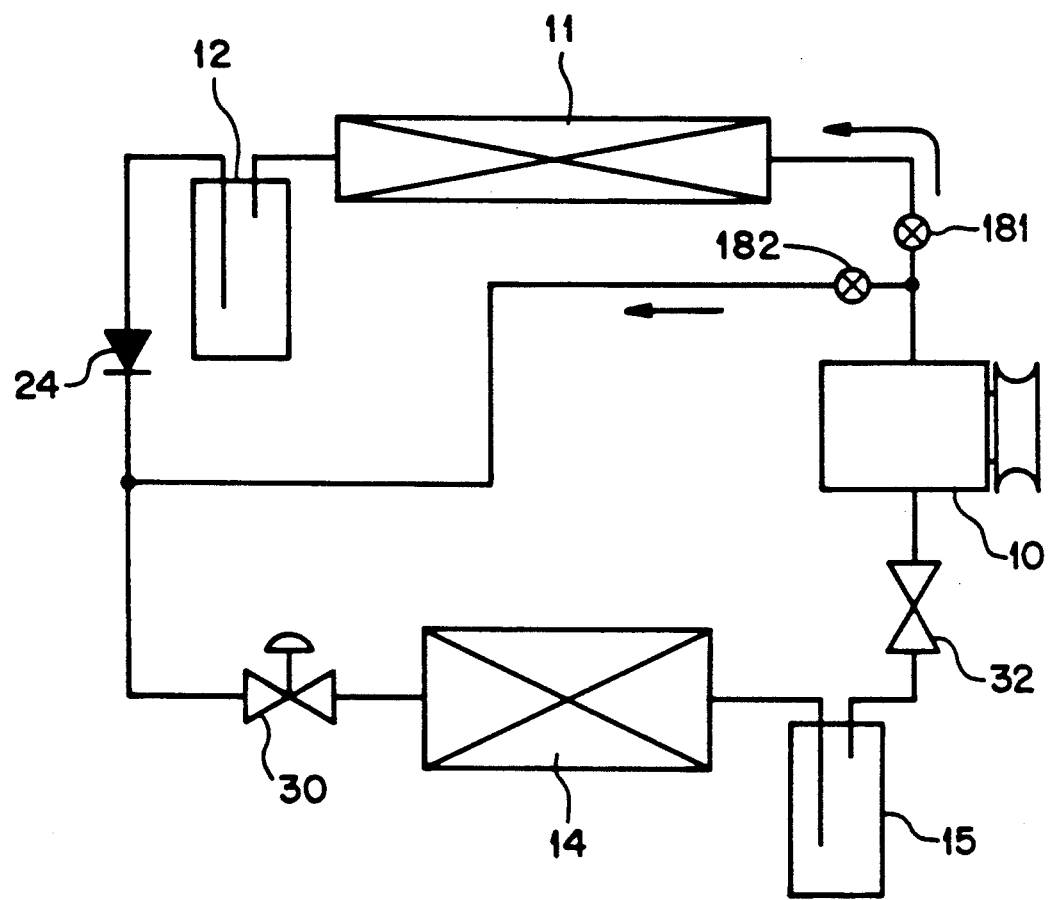
FIG. 6 is a refrigerating circuit showing a fourth embodiment of the present invention.

FIG. 6 shows a fourth embodiment of the present invention. The expansion valve 30 is disposed upstream of the heat exchanger 14 and the expansion valve 32. This embodiment includes advantages of the second embodiment and the third embodiment.

Figure 7:
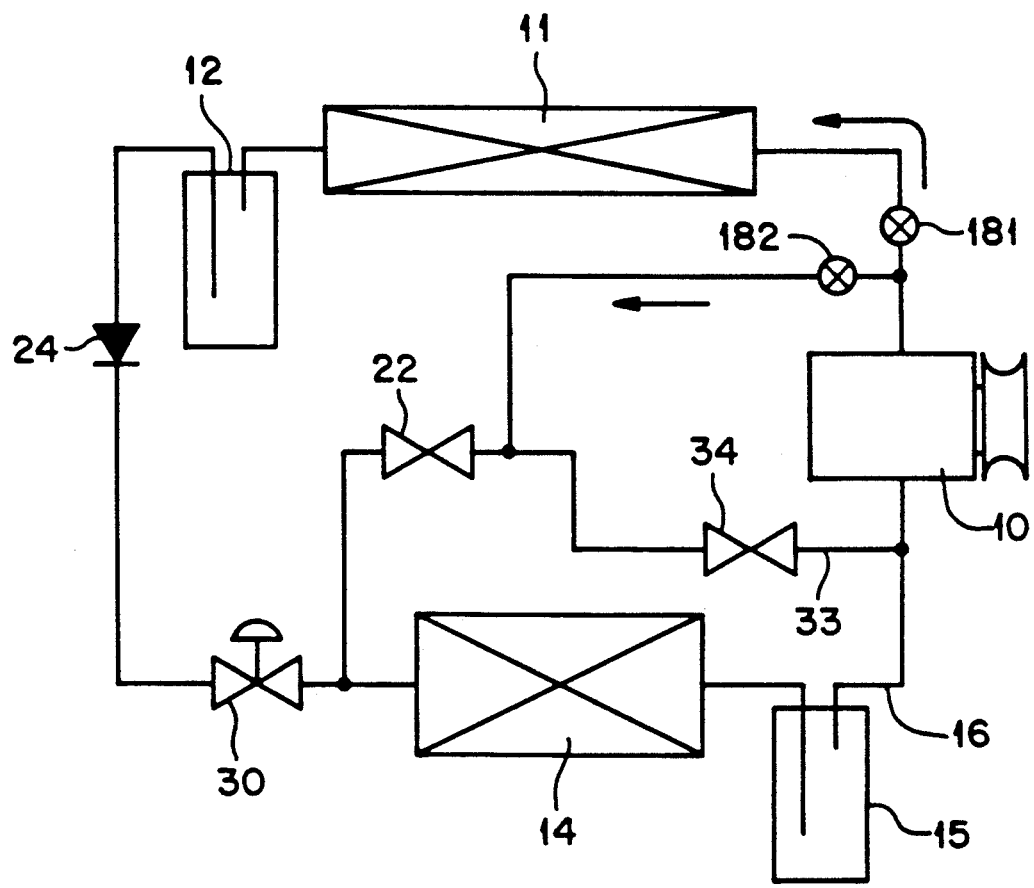
FIG. 7 is a refrigerating circuit showing a fifth embodiment of the present invention.

FIG. 7 shows a fifth embodiment of the present invention. A second bypass conduit 33 is provided, one end of which is connected to the bypass conduit 20 upstream of the expansion valve 22 and the other end of which is connected to the main conduit 16 between the accumulator 15 and the compressor 10. An expansion valve 34 is disposed in the second bypass conduit 33. The expansion valve 34 controls the amount of refrigerant flowing through the second bypass conduit 33 for controlling the heating ability of the heat exchanger 14.

Figure 8:
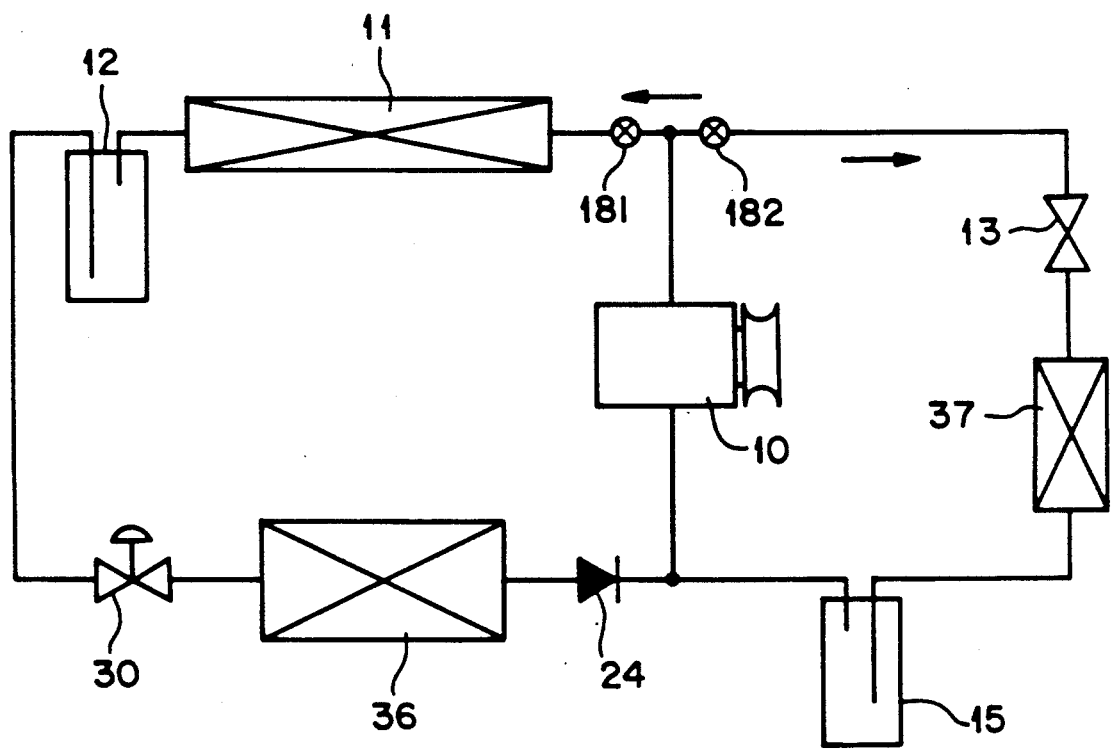
FIG. 8 is a refrigerating circuit showing a sixth embodiment of the present invention.
Figure 9:
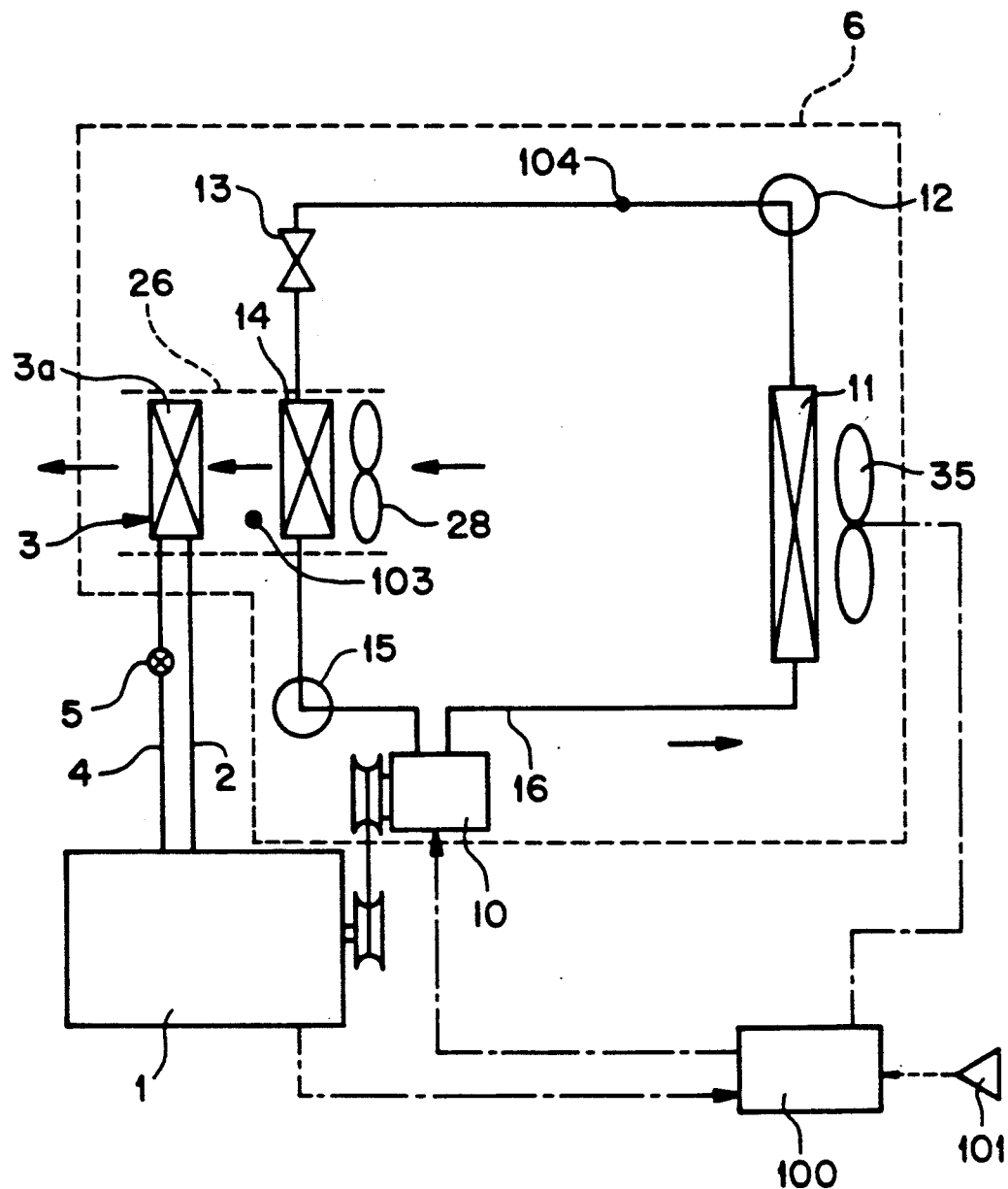
FIG. 9 is a refrigerating circuit showing a conventional apparatus according to the prior art.

FIG. 8 shows a sixth embodiment of the present invention. In this embodiment, a heat exchanger 36 for cooling and a heat exchanger 37 for heating are provided. The cooling heat exchanger 36 operates as an evaporator in cooling stage and the heating heat exchanger 37 operates as a heater in the heating stage. The remaining structure is similar to that of the previous embodiment.

If desired the air conditioner of the present invention can be used only for heating. In such a case, the condenser 11, the receiver 12 and the other parts for cooling are not necessary. The receiver 12 and the accumulator 15 control the amount of refrigerant circulating in the cycle; however, both of them are not always necessary if only one of them can adequately control the amount of refrigerant.

The heater core 301 may be replaced by a electric heater or other heater. The compressor 10 may be driven by an electric motor other than the engine 1. The first second electric valves 181, 182 can be replaced by a three-way valve.

What is claimed is:

1. An air conditioner comprising:
   main heating means for heating air passing therethrough;
   compressor means for compressing a refrigerant and discharging said compressed refrigerant therefrom;
   condenser means for condensing the refrigerant discharged from the compressor and for discharging condensed refrigerant therefrom;
   a heat exchanger receiving the discharged condensed refrigerant;
   first pressure reducing means for reducing the pressure of refrigerant which flows into the heat exchanger;
   a main conduit which connects the compressor, the condenser, the heat exchanger and the pressure reducing means to each other;
   a bypass conduit having a first end connected to the main conduit downstream of the compressor and a second end connected to the main conduit upstream of the heat exchanger, the bypass conduit being for introducing the compressed refrigerant toward the heat exchanger while bypassing the condenser;
   valve means which selectively opens the bypass conduit and the main conduit between the compressor and the condenser;
   a check valve disposed in said main conduit between said condenser and said heat exchanger; and
   second pressure reducing means disposed in said bypass conduit between said valve means and said second end for reducing pressure of compressed refrigerant flowing through said bypass conduit;
   the heat exchanger being disposed in such a manner that the heat exchanger exchanges heat with air which is subsequently heated by the main heating means, thereby complimentarily working to augment total heat added to the air.

2. An air conditioner according to claim 1, further comprising a duct in which the heat exchanger and the main heating means are disposed.

3. An air conditioner according to claim 1 wherein at least one of said pressure reducing means is an expansion valve.

4. An air conditioner according to claim 1, further comprising a third pressure reducing means which is disposed in the main conduit between the heat exchanger and the compressor.

5. An air conditioner according to claim 1, further comprising a receiver which is disposed downstream f the condenser for receiving liquid-phase refrigerant from the condenser and for discharging the liquid-phase refrigerant to the pressure reducing means.

6. An air conditioner according to claim 1, further comprising a second bypass conduit having a first end connected to the first bypass conduit and a second end connected to the main conduit between the heat exchanger and the compressor; and
   a third pressure reducing means disposed in the second bypass conduit.

7. An air conditioner according to claim 1, wherein the main heating means is a heater core through which an engine coolant flows.

* * * * *